United States Patent
Ema et al.

(10) Patent No.: US 10,390,545 B2
(45) Date of Patent: Aug. 27, 2019

(54) METHOD FOR CONCENTRATING PARTICULAR COMPONENT IN POWDER

(71) Applicant: NISSHIN SEIFUN GROUP INC., Tokyo (JP)

(72) Inventors: Akihiko Ema, Fujimino (JP); Kenji Jikihara, Fujimino (JP)

(73) Assignee: NISSHIN SEIFUN GROUP INC., Tokyo (JP)

( * ) Notice: Subject to any disclaimer, the term of this patent is extended or adjusted under 35 U.S.C. 154(b) by 275 days.

(21) Appl. No.: 15/319,245

(22) PCT Filed: Jun. 25, 2015

(86) PCT No.: PCT/JP2015/068339
§ 371 (c)(1),
(2) Date: Dec. 15, 2016

(87) PCT Pub. No.: WO2016/002621
PCT Pub. Date: Jan. 7, 2016

(65) Prior Publication Data
US 2017/0135362 A1    May 18, 2017

(30) Foreign Application Priority Data
Jun. 30, 2014 (JP) ................... 2014-135217

(51) Int. Cl.
*A23C 21/04* (2006.01)
*A23P 10/20* (2016.01)
*A23J 3/08* (2006.01)

(52) U.S. Cl.
CPC .............. *A23C 21/04* (2013.01); *A23J 3/08* (2013.01); *A23P 10/20* (2016.08)

(58) Field of Classification Search
CPC .............. A23C 21/04; A23P 10/20; A23J 3/08
See application file for complete search history.

(56) References Cited

U.S. PATENT DOCUMENTS 6,406,729 B1     6/2002  Miller et al.
2004/0251330 A1* 12/2004  Takahashi ............ B02C 19/068
                                                      241/20

(Continued)

FOREIGN PATENT DOCUMENTS

CA      2046741 A1    11/1992
JP      6-062756 A     3/1994

(Continued)

OTHER PUBLICATIONS

Pulvocron Air Swept Pulverizer Machine. https://www.bepex.com/equipment/pulvocron-2/ No date provided.*

*Primary Examiner* — Anthony J Weier
(74) *Attorney, Agent, or Firm* — Muncy, Geissler, Olds & Lowe, P.C.

(57) ABSTRACT

A method for concentrating a particular component in powder by performing a mechanical dry processing on powder formed by granulating a solution containing two or more components, producing chips in a fine-powder form by chipping away at particle surfaces of the powder where a larger amount of the particular component is contained than particle interior portions of the powder, classifying the powder into fine powder containing the chips and coarse powder containing particles whose surfaces have been chipped away, and collecting the fine powder containing the particular component.

14 Claims, 13 Drawing Sheets

(56) References Cited

U.S. PATENT DOCUMENTS

| | | | | |
|---|---|---|---|---|
| 2005/0139701 A1* | 6/2005 | Naka | ............ | B02C 23/10 |
| | | | | 241/5 |
| 2006/0183828 A1* | 8/2006 | Dairoku | ............ | A61L 15/60 |
| | | | | 524/155 |
| 2013/0186993 A1* | 7/2013 | Yoshikawa | ............ | B02C 19/066 |
| | | | | 241/79 |
| 2014/0356450 A1* | 12/2014 | Atomi | ............ | A61K 35/57 |
| | | | | 424/581 |

FOREIGN PATENT DOCUMENTS

| | | | |
|---|---|---|---|
| JP | 6-507312 | A | 8/1994 |
| JP | 9-122401 | A | 5/1997 |
| JP | 2006-297373 | A | 11/2006 |
| JP | 2007-091688 | | 4/2007 |

\* cited by examiner

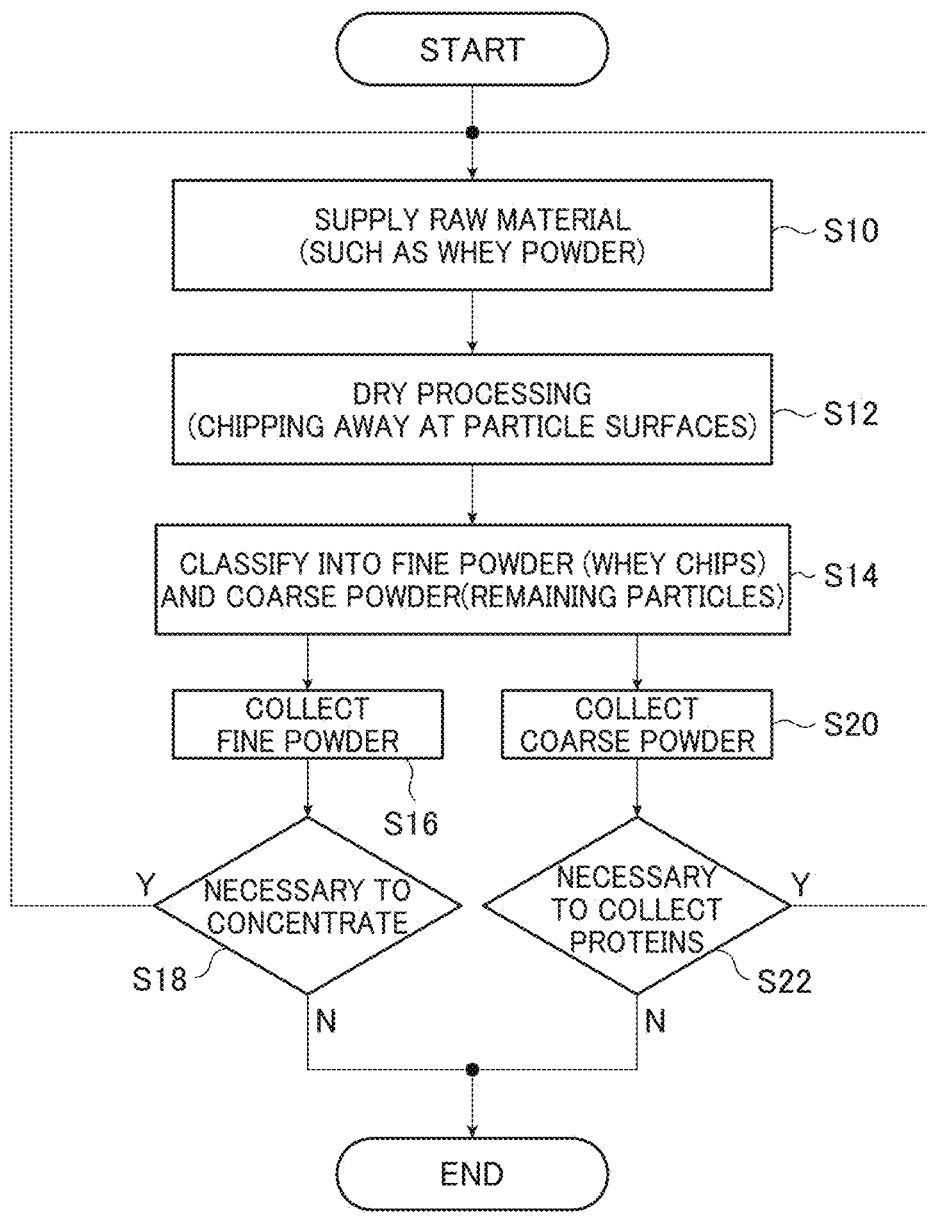

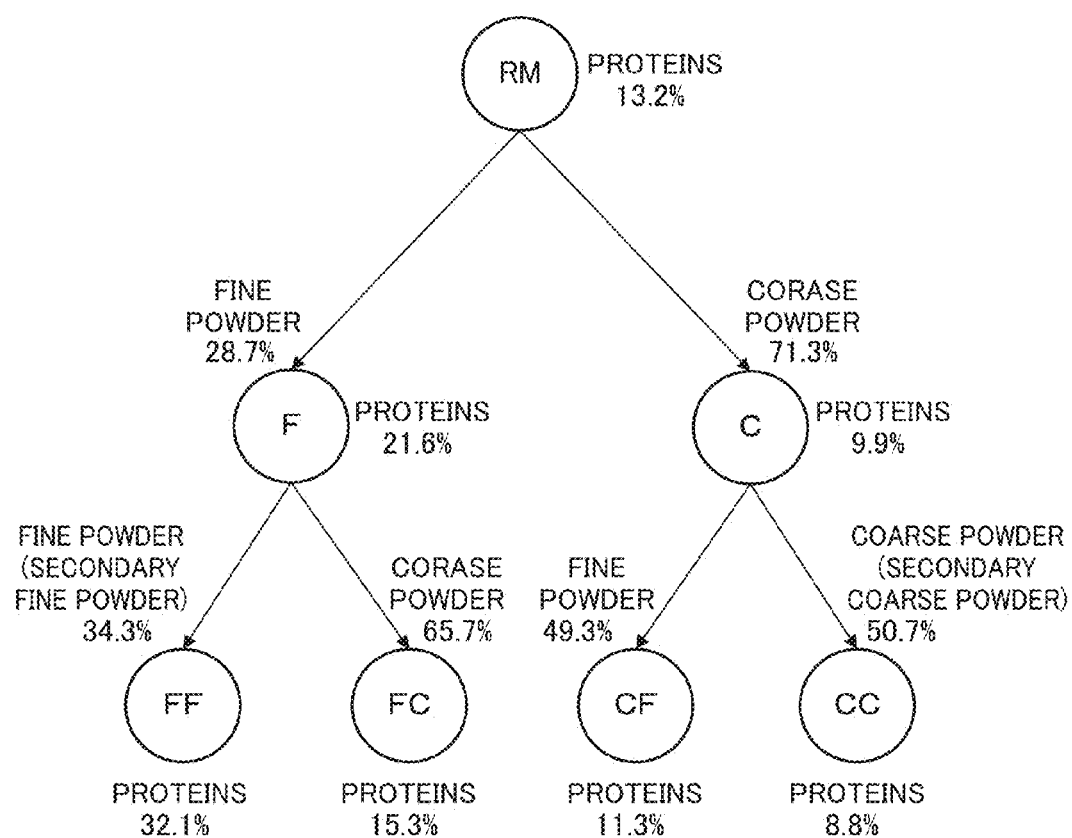

30 μm

30 μm

30 μm

METHOD FOR CONCENTRATING PARTICULAR COMPONENT IN POWDER

TECHNICAL FIELD

The present invention relates to a method for concentrating a particular component in powder that is formed by granulating a solution containing two or more components. More specifically, the invention relates to a method for concentrating one or more particular components in powder in a dry state using a mechanical dry processing apparatus, and a method for concentrating a particular component that further concentrates a particular component in powder in a wet operation, in which powder one or more particular components have been thus concentrated with the powder being held in a dry state.

In particular, the invention relates to a method for concentrating proteins in whey powder that has been granulated by the spray-drying technique. More specifically, the invention relates to a method for concentrating proteins in whey powder in a dry state using a mechanical dry processing apparatus, and a method for concentrating proteins that further concentrates proteins in whey powder in a wet operation, in which whey powder proteins have been thus concentrated with the powder being held in a dry state.

BACKGROUND ART

Whey is also called "milk serum," and a large amount of whey is produced in the process of cheese production as a by-product. In the process of cheese production, a fungus, an acid or the like is added in milk to cause reaction therebetween, whereby a solid content called "curd," i.e., an aggregate of casein protein is separated from a liquid portion called "whey" containing proteins most of which are whey proteins, minerals and lactose.

While whey has been mostly discarded in the past, whey began to receive recognition as a highly nutritious food with high proteins and low fats.

Due to its rich nutritions, whey easily deteriorates in quality. Hence, whey is dehydrated to be in a powdery form and is distributed in the form of whey powder.

That is, a whey protein concentrate in which proteins are concentrated while lactose and ash concentrations are decreased by removing lactose and other components, which are contained in whey in addition to proteins, from whey through, for example, ultrafiltration, or a protein-concentrated whey powder that is made by dehydrating such whey protein concentrate is sold on the market and used in production of infant foods as a protein source, in production of other various foods as an ingredient, and the like.

Patent Literature 1 discloses a technique for fractionating proteins from whey, where whey or concentrated whey obtained through ultrafiltration is passed through a column packed with an anion exchanger without adjusting the pH of the whey to effect the adsorption of (β-lactoglobulin to the anion exchanger, and the adsorbed β-lactoglobulin is eluted with a salt solution.

Patent Literature 2 discloses a technique for producing a protein concentrate from whey, where lactose is removed as permeate (extracted lactose, minerals) at the whey ultrafiltration step, the ultrafiltered whey retentate is subjected to heat treatment to cause about 50% or more and 90% or less in total of proteins in whey to denature, and the heat-treated whey is concentrated to produce a whey protein concentrate.

CITATION LIST

Patent Literature

Patent Literature 1: JP 6-62756 A
Patent Literature 2: JP 6-507312 A

SUMMARY OF INVENTION

Technical Problems

When the technique disclosed in Patent Literature 1 is adopted, whey would need to undergo repetition of protein absorption and protein elution using an anion exchange membrane, which is complicated, involving complex steps.

When the technique disclosed in Patent Literature 2 is adopted, proteins could be concentrated but would be heat-denatured; hence, the technique could not be used in an application which would utilize proteins not deactivated.

Furthermore, in either of these techniques, the concentration process is simply carried out on whey in a liquid state and requires a drying process to powder the whey subsequent to the concentration process in order to avoid quality deterioration.

The present invention has an object to provide a method for concentrating proteins in whey powder by processing whey powder in a powdery form that allows easy handling and does not readily deteriorate, with the whey powder being held in a dry state, and a method for concentrating proteins that further concentrates proteins in fine powder of whey in a wet operation, in which fine powder of whey proteins have been concentrated by the above method with the fine powder being held in a dry state.

Solution to Problems

In order to attain the above-described object, the inventors of the invention conducted intensive studies and, as a result, discovered that proteins in whey powder can be concentrated when whey powder formed by the spray-drying technique is subjected to a mechanical dry processing to chip away at particle surfaces of the whey powder, and whey chips in a fine-powder form are produced, classified and collected.

More specifically, the concentrating method of the invention is a concentrating method for concentrating one or more particular components in powder using a dry processing apparatus that performs a mechanical dry processing, the powder being formed by granulating a solution containing two or more components, including a step of supplying the dry processing apparatus with the powder as a raw material, a step of producing chips in a fine-powder form by performing the dry processing on the powder supplied to the dry processing apparatus to chip away at particle surfaces of the powder, the particle surfaces containing a large amount of one or more particular components, a step of classifying the powder into fine powder containing the produced chips and coarse powder containing particles whose surfaces have been chipped away, and a step of collecting the classified fine powder containing the chips.

Preferably, the dry processing apparatus is an airflow-type classifier including a classifying chamber, and in the airflow-type classifier, the powder supplied into the classifying chamber is carried on a whirling airflow such that particle surfaces of the powder are chipped away to produce the chips and is classified into the fine powder containing the produced chips, whereby the airflow-type classifier carries out the step of producing chips and the step of classifying for obtaining fine powder containing the chips simultaneously.

Preferably, an amount of the chips produced in the step of producing chips is controlled by controlling at least one of a feeding rate of the powder to the airflow-type classifier, an air volume, and a number of revolutions of a rotor in the airflow-type classifier.

Preferably, a classification point in the step of classifying for obtaining the fine powder containing the chips at which the fine powder containing the chips is separated from the coarse powder is controlled by controlling at least one of a feeding rate of the powder to the airflow-type classifier, an air volume, and a number of revolutions of a rotor in the airflow-type classifier.

Preferably, the dry processing apparatus includes a pulverizer and a classifier, the step of producing chips is a step of producing the chips by chipping away at particle surfaces of the powder using the pulverizer, and the step of classifying for obtaining the fine powder containing the chips is a step of classifying the powder into the fine powder containing the produced chips and the coarse powder using the classifier.

Preferably, the pulverizer comprises one or more selected from a group consisting of an airflow-type pulverizer, a friction-type pulverizer, an impact-type pulverizer and a ball-type pulverizer, and the classifier comprises one or more selected from a group consisting of an airflow-type classifier and a sieve. Note that an apparatus or equipment constituting the dry processing apparatus is not limited to a pulverizer or a classifier and may be any apparatus capable of chipping way at surfaces to produce chips or any equipment that performs such operation, and an apparatus capable of separating and collecting the chips or any equipment that performs such operation. In addition, an apparatus having both capabilities or equipment that performs both operations may be used.

Preferably, the powder is formed by granulating a solution containing two or more components having different dissolution properties using a spray-drying technique.

Preferably, one or more particular components in the fine powder are concentrated by repeating a step of again supplying the dry processing apparatus with, as a raw material, the fine powder containing the chips collected in the step of collecting the fine powder, a step of producing chips in a finer-powder form by performing the dry processing on the supplied fine powder containing the chips to chip away at particle surfaces of the fine powder, a step of separating finer powder containing the produced chips in a finer-powder form from the remaining fine powder whose particle surfaces have been chipped away, and a step of collecting the separated finer powder.

Preferably, the concentrating method further includes a step of collecting the coarse powder containing particles whose surfaces have been chipped away.

Preferably, one or more particular components in the fine powder are concentrated by repeating a step of again supplying the dry processing apparatus with, as a raw material, the coarse powder containing particles whose surfaces are chipped away and collected in the step of collecting the coarse powder, a step of further producing chips in a fine-powder form by performing the dry processing on the supplied coarse powder containing particles whose surfaces have been chipped away to chip away at particle surfaces of the coarse powder, a step of separating fine powder containing the produced chips from the remaining coarse powder whose particle surfaces have been further chipped away, and a step of collecting the separated fine powder.

Preferably, the two or more components include at least one of proteins, minerals and lactose.

Preferably, the powder is whey powder, and the one or more particular components include proteins and minerals.

Preferably, the powder is whey powder, the one or more particular components include proteins, minerals and lactose, and the coarse powder containing particles whose surfaces have been chipped away is coarse powder containing particles whose surfaces have been chipped away, the particles containing a lactose component.

Moreover, a method for concentrating a particular component further includes a process of concentrating one or more particular components by a wet operation, using as a raw material an intermediate product containing fine powder in which one or more particular components are concentrated by the above-described method for concentrating one or more particular components in powder that has been granulated.

Preferably, the one or more particular components are proteins.

Preferably, the one or more particular components are minerals.

Moreover, a method for concentrating a particular component further includes a process of concentrating one or more particular components by a wet operation, using as a raw material an intermediate product containing coarse powder in which one or more particular components are concentrated by the above-described method for concentrating one or more particular components in powder that has been granulated.

Preferably, the one or more particular components are lactose.

Advantageous Effects of Invention

According to the invention, proteins can be concentrated as being held in a dry state as whey powder in a powdery form that allows easy handling and does not readily deteriorate is subjected to the mechanical dry processing.

In addition, according to the invention, a mineral component can be concentrated as being held in a dry state from whey powder through the dry processing.

In addition, according to the invention, a lactose component can be concentrated as being held in a dry state from the whey powder through the dry processing.

Moreover, according to the invention, a transportation cost and a processing cost of a wet operation can be reduced as whey powder in which proteins are concentrated through the dry processing is used as a raw material for a wet concentration operation.

Furthermore, according to the invention, a transportation cost and a processing cost of a wet operation can be reduced as whey powder in which minerals are concentrated through the dry processing is used as a raw material for a wet concentration operation.

BRIEF DESCRIPTION OF DRAWINGS

FIG. 1 is a flowchart illustrating an exemplary flow of a method for concentrating proteins in whey powder according to an embodiment of the present invention.

FIG. 4 is a diagram showing proportions of fine powder samples to coarse powder samples separated as a result of implementing the method for concentrating proteins in an embodiment of the present invention, and the protein contents in the respective samples.

FIG. 12(a) is an element mapping image of Na; FIG. 12(b) is an element mapping image of K; and FIG. 12(c) is an element mapping image of Ca.

DESCRIPTION OF EMBODIMENTS

Below described in detail is a preferred embodiment of a method for concentrating a particular component in powder that is formed by granulating a solution containing two or more components having different dissolution properties according to the invention, that is, an example of a method for concentrating proteins in whey powder, based on the preferred embodiments illustrated in the attached drawings.

In the invention, powder formed by granulating a solution containing two or more components having different dissolution properties is not particularly limited as long as it is a dried powder made from a solution containing two or more components having different dissolution properties. Examples of such powder include powder that has been granulated by the spay-drying technique or vacuum-drying technique, and, particularly, powder that has been granulated by the spray-drying technique is preferably used. This is because powder granulated by the spay-drying technique has a large deviation in the component distribution within each particle.

In the invention, dissolution properties refer to properties exhibiting when the liquid phase dries and changes to the solid phase, such as an amount of a component that can be dissolved in a solvent (solubility), ease of mixing or separation of two or more different components (affinity), and ease of gathering or dispersion of a same component.

In the embodiment, whey powder granulated by the spray-drying technique is used, and a method for concentrating proteins in whey powder is described. However, this is not a sole case and any powder that is formed by granulating a solution containing two or more components may be used, and powdered skim milk and instant coffee, for example, may be used as the spray-dried powder.

Before describing the method for concentrating proteins in whey powder (hereinafter, also referred to simply as a "protein concentrating method") according to the embodiment of the invention, whey powder used as a raw material in the method according to the embodiment of the invention will be described.

Figure 5A:
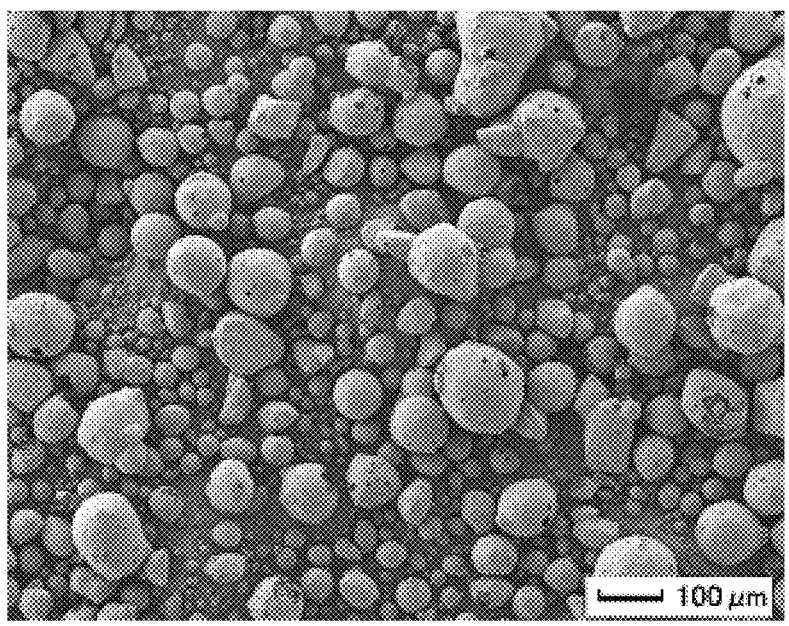
FIG. 5(a) is a drawing-substituting photograph, photographed by a scanning electron microscope (SEM), of whey powder used as a raw material.
Figure 5B:
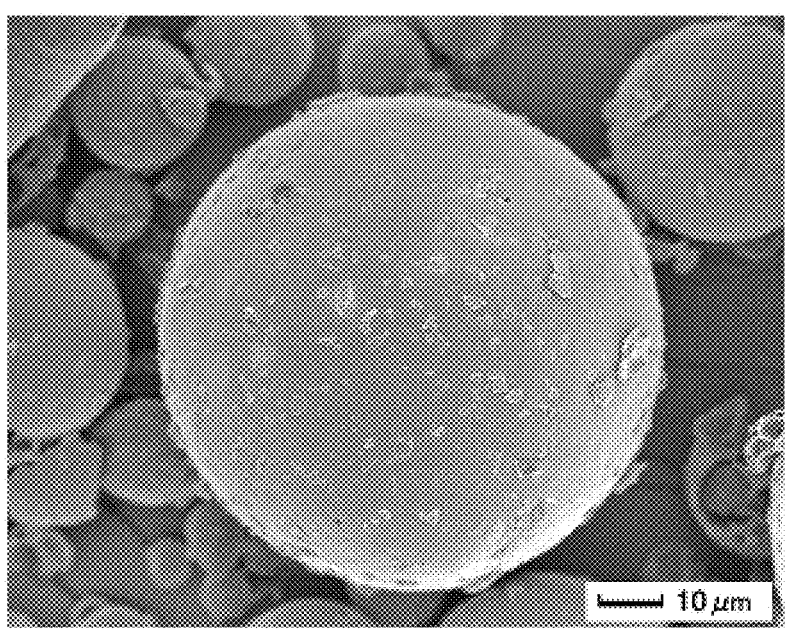
FIG. 5(b) is an enlargement of the photograph of FIG. 5(a).

Whey powder used as a raw material in the embodiment is dried whey powder produced by the spray-drying technique. A particle shape and a particle size of such whey powder are not particularly limited and may have any shape and size as long as powder is produced by the spray-drying technique, but powder preferably has a smooth shape with little unevenness on particle surfaces. For instance, whey powder shown in FIGS. 5(a) and 5(b) is preferably used as a raw material.

Whey powder produced by the spray-drying technique has component deviation occurring in its production, due to different dissolution properties of plural kinds of components contained in whey powder. Hence, lactose tends to segregate in a central portion of a whey powder particle, while the protein-rich portion tends to segregate near the surface of a whey powder particle. That is, the surface of a whey powder particle is likely to have a high concentration of protein since proteins are present so as to surround lactose that segregates in a central portion of the whey powder particle.

Accordingly, by chipping away at the surface of a whey powder particle and collecting fine powder formed of the chips, proteins in whey powder can be concentrated.

FIG. 1 is a flowchart illustrating an exemplary flow of the method for concentrating proteins in whey powder according to the embodiment of the present invention.

The method for concentrating proteins in whey powder according to the embodiment includes and carries out a step (process) S10 of supplying a raw material such as whey powder, a step S12 of producing whey chips in a fine-powder form by chipping away at particle surfaces of the raw material such as whey powder, the particle surfaces containing a large amount of proteins, a step S14 of classifying the raw material into fine powder containing whey chips in a fine-powder form and coarse powder containing the remaining particles, a step S16 of collecting the classified fine powder, a step S18 of determining whether to further concentrate the collected fine powder, a step S20 of collecting the classified coarse powder, and a step S22 of determining whether to collect proteins from the collected coarse powder, as illustrated in FIG. 1.

According to the embodiment, in the step S10 of supplying a raw material, whey powder as the raw material is supplied as being held in a dry state to a dry processing apparatus that performs a mechanical dry processing. In this step, while the supplying method is not particularly limited and may be any method, whey powder as a raw material is preferably supplied at a constant rate like when being supplied by using a screw feeder, a vibrating feeder or the like.

Next, in the step S12 of producing whey chips in a fine-powder form by chipping away at particle surfaces of whey powder where a large amount of proteins is contained, the dry processing apparatus performs the mechanical dry processing to chip away at particle surfaces of the whey powder supplied as the raw material as being held in a dry state and produces whey chips.

In this step, the method for chipping away at particle surfaces and producing whey chips is not particularly limited as long as the method chips away at particle surfaces without pulverizing whey powder, and examples of the method include a method of applying a gas to whey powder and using a shear force occurring between particles and the gas or friction among particles or friction due to collision of particles against a wall (e.g., airflow-type classifier and airflow-type pulverizer) and a method of stirring whey powder in a vessel and using friction among particles, friction between particles and a wall, or friction against a stirring element that is simultaneously introduced in the vessel (e.g., friction-type pulverizer, impact-type pulverizer and ball-type pulverizer).

In the step S14 of classifying the raw material into coarse powder and fine powder, classification is made between the fine powder containing whey chips in a fine-powder form containing a large amount of proteins and the coarse powder containing particles whose surfaces have been chipped away, thereby separating fine powder from coarse powder. In this step, if an apparatus with a classification function like an airflow-type classifier is used, the step S12 of producing whey chips in a fine-powder form and the step S14 of classifying the raw material into coarse powder and fine powder can be simultaneously carried out. If this is not the case, an apparatus capable of independently classifying materials by particle size (such as an airflow-type classifier or a vibration sieving device) may be used.

In the step S16 of collecting the classified fine powder, the fine powder separated in the step S14 of classifying the raw material into coarse powder and fine powder is collected.

In the embodiment, while the method for concentrating proteins in whey powder may be terminated when fine powder is collected in the step S16, in order to increase the protein concentration, e.g., in order to achieve a target value (target concentration), the step S18 of determining necessity of concentration may be provided, and the method of concentrating proteins may be carried out over again.

In addition, in the embodiment, the step S20 of collecting coarse powder that is separated from fine powder in the step S14 may be provided to positively collect and use coarse powder, and the step S22 of determining necessity of protein collection may be provided to carry out the method for concentrating proteins over again, using the collected coarse powder as a raw material.

That is, when the step S18 of determining necessity of concentration is carried out and determines that further concentration of the collected fine powder is not necessary, the concentrating method of the embodiment is terminated, and the fine powder collected in the step S16 will become a finished product. The thus collected fine powder is whey powder in which proteins are concentrated; the concentrated whey powder may be dissolved and subjected to a conventional wet technique, whereby various types of protein fractions may be produced.

In the meantime, when the step S18 of determination determines that further concentration is necessary, the process goes back to the step S10 of supplying a raw material, the collected fine powder (primary fine powder) is supplied as a raw material to the dry processing apparatus, the primary fine powder supplied to the dry processing apparatus is subjected to the mechanical dry processing again in the step S12 so that whey chips in a finer-powder form (secondary whey chips) are produced, the fine powder (secondary fine powder) containing the secondary whey chips is separated from the primary fine powder whose particles have been chipped away at surfaces and which becomes coarse powder with respect to the secondary fine powder in the step S14, the separated secondary fine powder is collected in the step S16, and the whole process is repeated until the step S18 determines that further concentration is not necessary.

On the other hand, in the step S20 of collecting the classified coarse powder, the coarse powder separated in the step S14 of classifying a raw material into coarse powder and fine powder is collected. Since the collected coarse powder contains a large amount of lactose component, this step can be used to extract lactose component.

In the embodiment, the method for concentrating proteins in whey powder may be terminated when coarse powder is collected in the step S20. Meanwhile, since the collected coarse powder containing a large amount of lactose component still contains proteins, the step S22 of determining necessity of collection of proteins may be provided and, in order to increase the recovery rate of proteins in whey powder, the method of concentrating proteins may be carried out over again, using the collected coarse powder as a raw material.

That is, when the step S22 of determining necessity of further collection of proteins from the collected coarse powder is carried out and determines that collection of proteins from the collected coarse powder is not necessary, the concentrating method of the embodiment may be terminated, and whey powder in which proteins are concentrated may be subjected to a conventional wet technique which, for example, has whey powder dissolved in water and uses an ion exchange membrane or ultrafiltration membrane, whereby various types of protein fractions may be further produced.

In the meantime, when the step S22 of determination determines that further collection of proteins is necessary, in order to increase the recovery rate of proteins in whey powder, the process goes back to the step S10 of supplying a raw material, the collected coarse powder (primary coarse powder) is supplied as a raw material to the dry processing apparatus, the primary coarse powder supplied to the dry processing apparatus is subjected to the mechanical dry processing again in the step S12 and is further chipped away at particle surfaces so that whey chips in a fine-powder form are produced, the fine powder (coarse fine powder) containing the whey chips is separated from the rest of the coarse powder (secondary coarse powder) whose particle surfaces have been chipped away in the step S14, the coarse fine powder separated in the step S14 is collected in the step S16, the secondary coarse powder separated in the step S14 is collected in the step S20, and the whole process is repeated until the step S22 determines that further collection of proteins is not necessary.

Similarly to the secondary fine powder described above, in order to increase the protein concentration, e.g., in order to achieve a target value (target concentration), the method of concentrating proteins of the embodiment may be repeated using the coarse fine powder collected in the step S16 until the step S18 determines that concentration is not necessary.

For instance, in the concentrating method of the embodiment, as illustrated in FIG. 4, a whey powder raw material (RM) containing 13.2 wt % of proteins (see FIGS. 5(a) and 5(b)) is subjected to the first dry processing, whereby 28.7 wt % of fine powder (primary fine powder F) with a protein content of 21.6 wt % and 71.3 wt % of coarse powder (primary coarse powder C) with a protein content of 9.9 wt % are separated and obtained.

Figure 8A:
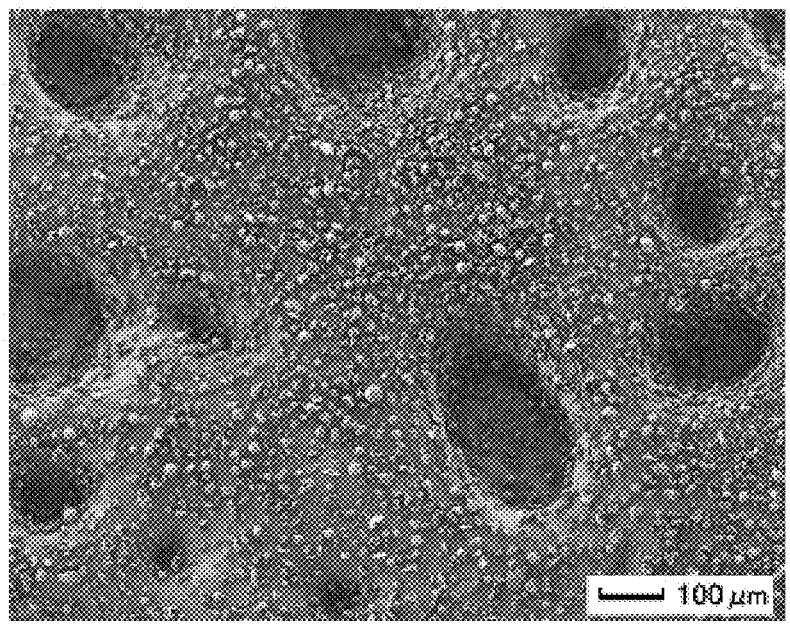
FIG. 8(a) is a drawing-substituting photograph, photographed by a scanning electron microscope (SEM), of fine powder (FF) collected at the fine powder side in the fine powder (F) that is collected at the fine powder side in whey powder processed by the dry processing apparatus and is further processed by the dry processing apparatus.
Figure 8B:
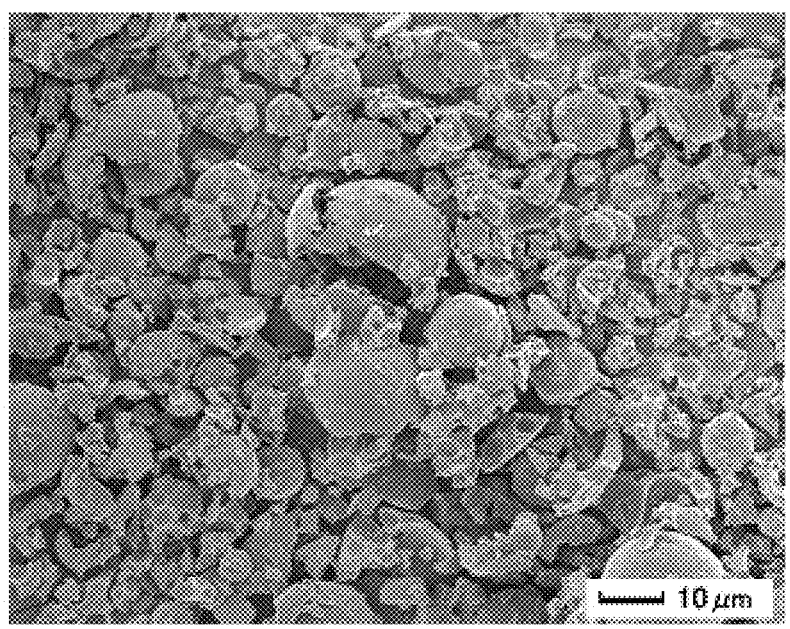
FIG. 8(b) is an enlargement of the photograph of FIG. 8(a).

The thus obtained primary fine powder (F) with a protein content of 21.6 wt % is subjected to the second dry processing, whereby 34.3 wt % of fine powder (secondary fine powder FF) with a protein content of 32.1 wt % (see FIGS. 8(a) and 8(b)) and 65.7 wt % of coarse powder (fine coarse powder FC) with a protein content of 15.3 wt % can be separated and obtained.

Figure 9A:
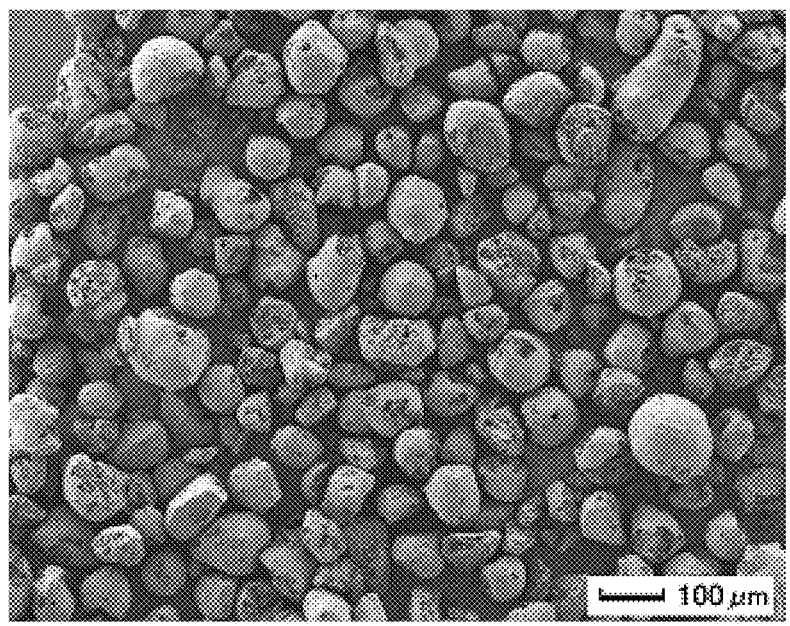
FIG. 9(a) is a drawing-substituting photograph, photographed by a scanning electron microscope (SEM), of coarse powder (CC) collected at the coarse powder side in the coarse powder (C) that is collected at the coarse powder side in whey powder processed by the dry processing apparatus and is further processed in the dry processing apparatus.
Figure 9B:
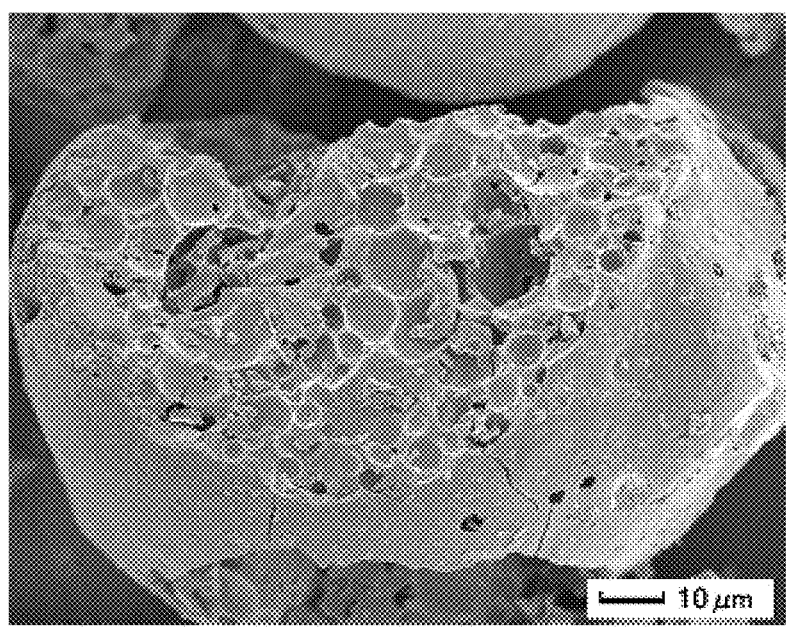
FIG. 9(b) is an enlargement of the photograph of FIG. 9(b).

On the other hand, the primary coarse powder (C) with a protein content of 9.9 wt % obtained by the first dry processing is subjected to the second dry processing, whereby 49.3 wt % of fine powder (coarse fine powder CF) with a protein content of 11.3 wt % and 50.7 wt % of coarse powder (secondary coarse powder CC) with a protein content of 8.8 wt % (see FIGS. 9(a) and 9(b)).

In the embodiment, production of whey chips in a fine-powder form by performing the dry processing on whey powder and chipping away at particle surfaces where a large amount of proteins is contained in the step S12 means production of fine powder containing whey chips or whey flakes in a fine-powder form (see, for example, FIGS. 8(a) and 8(b)) by chipping away at or scraping particle surfaces of whey powder as a raw material. As a result, coarse powder containing particles of whey powder whose surfaces have been chipped away (see, for example, FIGS. 9(a) and 9(b)) is also produced simultaneously.

In the embodiment, since concentration of proteins involves production of fine powder containing whey chips in a fine-powder form that are taken from particle surfaces where a large amount of proteins is contained, separation of fine powder from coarse powder and collection of fine powder, the protein concentration (concentration level) may be controlled by varying the strength of chipping away at particle surfaces where a large amount of proteins is contained, that is, the strength for producing whey chips in a fine-powder form, and classification point for classifying a raw material into fine powder and coarse powder.

Meanwhile, the inventors of the present invention have intensely studied and found that by employing the concentrating method using the mechanical dry processing of the embodiment, plural kinds of minerals can be concentrated together with proteins.

Figure 10A:
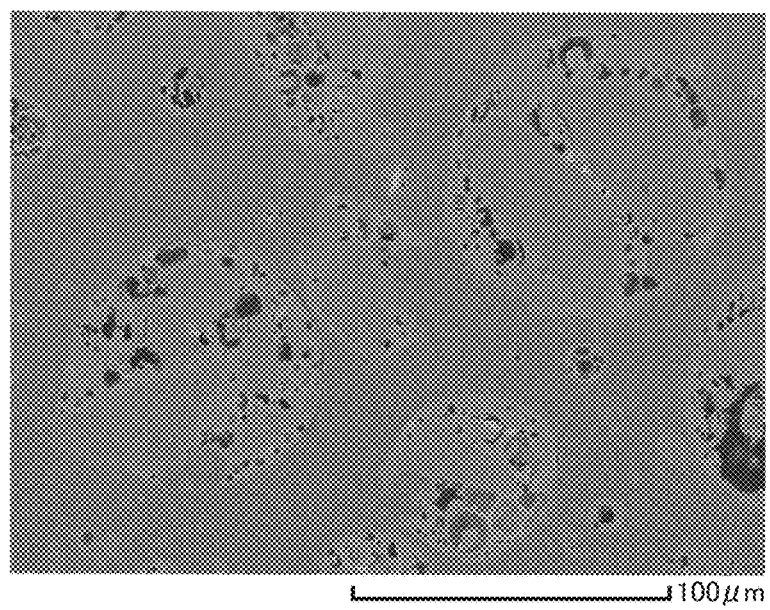
FIG. 10(a) is a drawing-substituting photograph, photographed by a scanning electron microscope (SEM), of a cross section of whey powder.
Figure 10B:
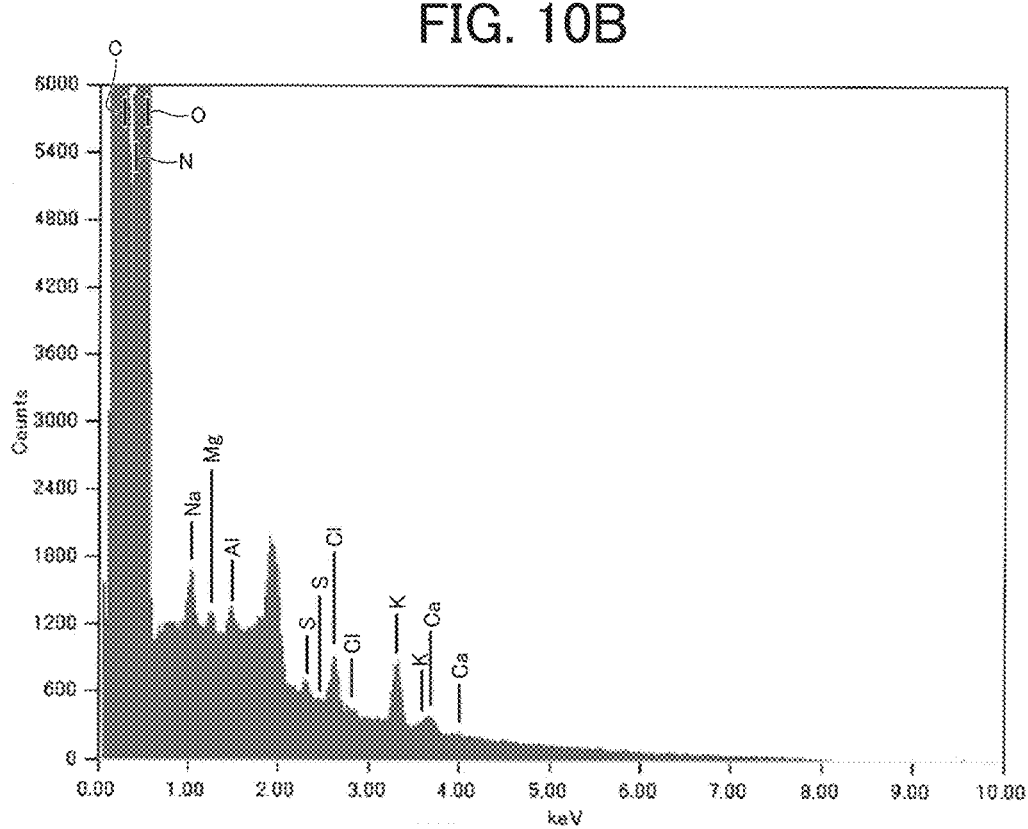
FIG. 10(b) is a diagram showing an EDS spectrum thereof.
Figure 11A:
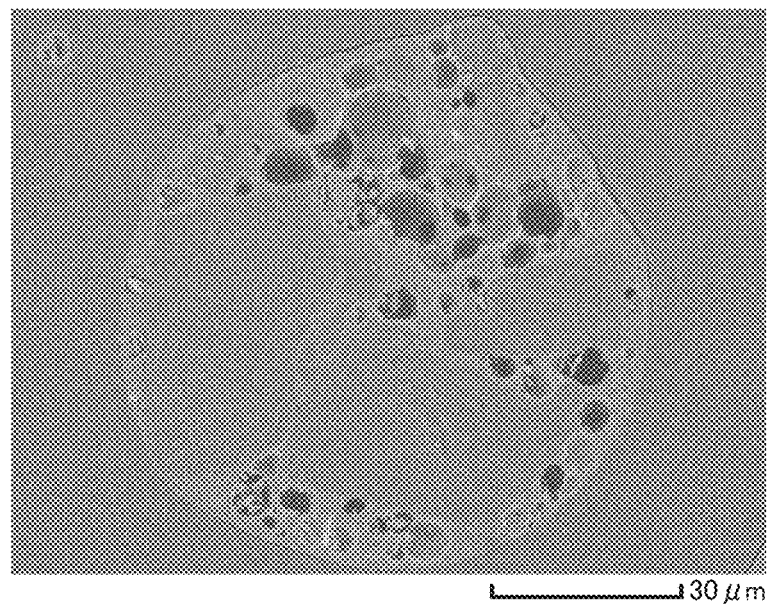
FIG. 11(a) is a drawing-substituting photograph, photographed by a scanning electron microscope (SEM), of a cross section of whey powder and is an enlargement of the photograph of FIG. 10(a)
Figure 11B:
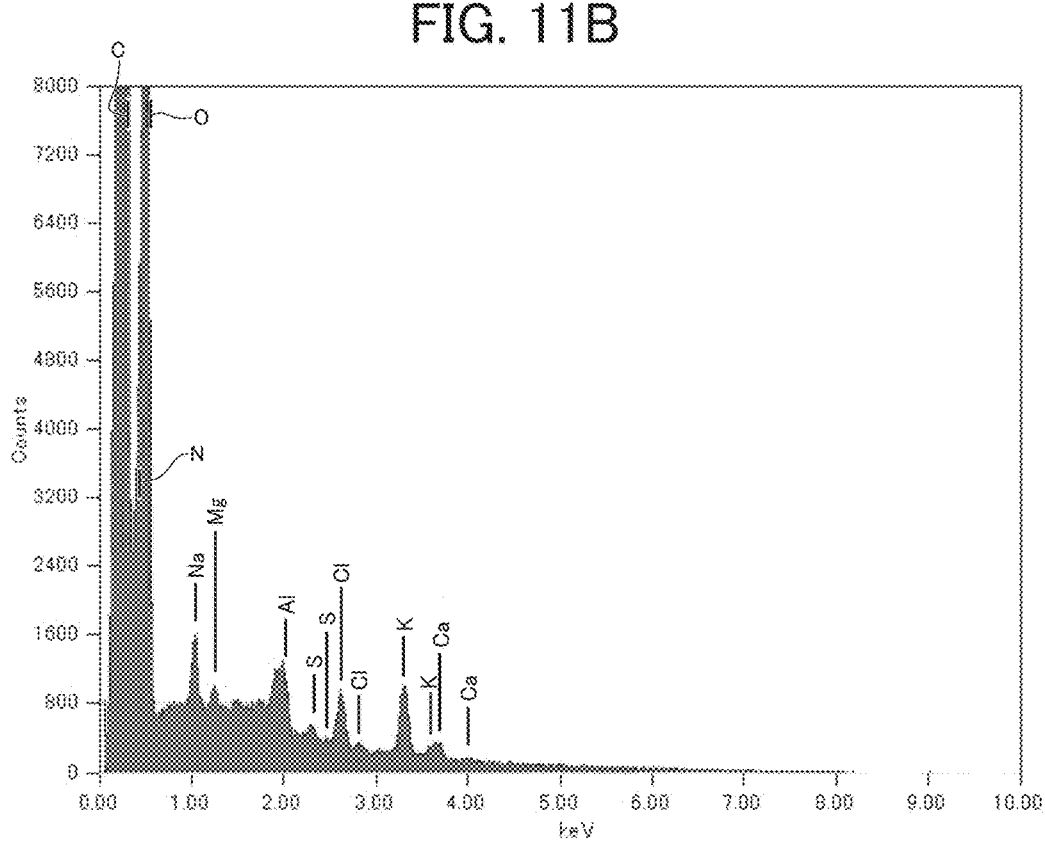
FIG. 11(b) is a diagram showing an EDS spectrum thereof.
Figure 12A:
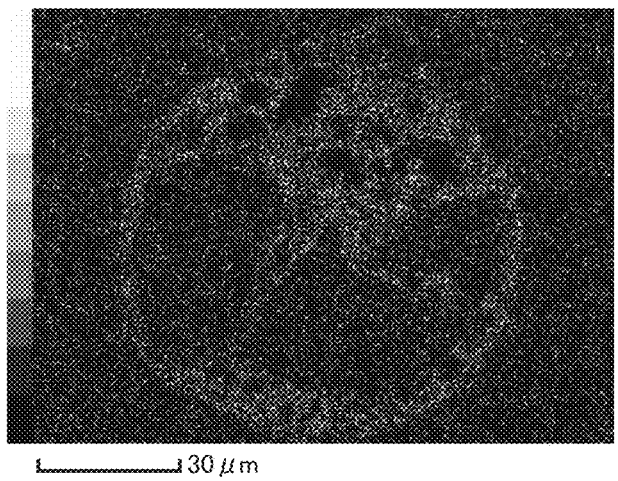
FIGS. 12(a), 12(b), and 12(c) are EDS mapping images of cross sections of whey powder shown in FIGS. 11.
Figure 12B:
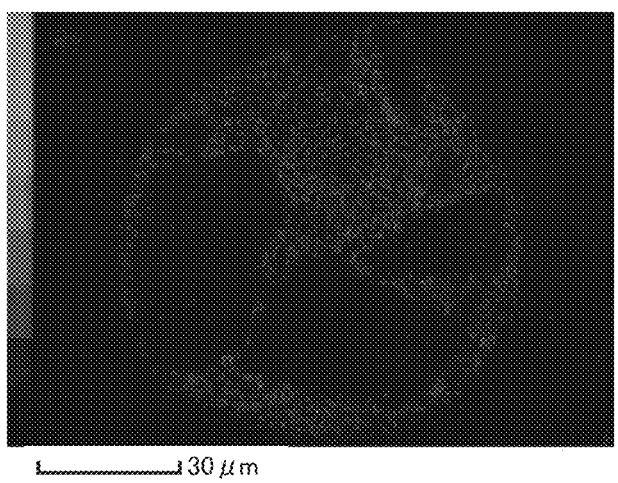
Figure 12C:
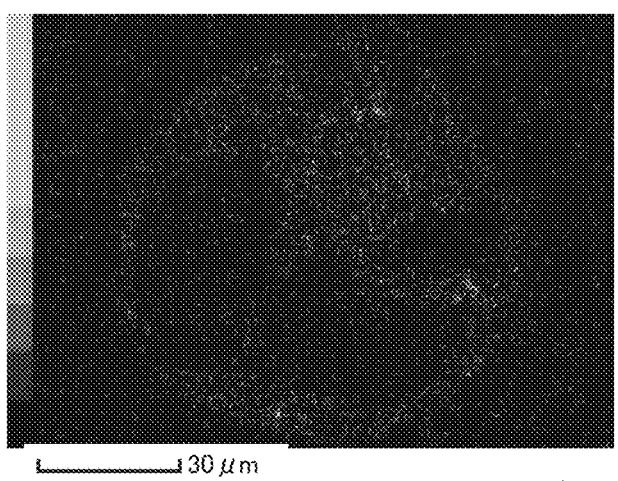

FIG. 10(a) is a drawing-substituting photograph of a cross section of whey powder (RM) that is produced by the spray-drying technique photographed by a scanning electron microscope (SEM), and FIG. 10(b) is a diagram showing an EDS spectrum thereof that is detected using an EDS (JED-2300F; available from JEOL Ltd.). FIG. 11(a) is an enlarged drawing of FIG. 10(a), and FIG. 11(b) is a diagram showing an EDS spectrum thereof that is detected using an EDS (JED-2300F; available from JEOL Ltd.). FIGS. 12 are EDS mapping images of a cross section of whey powder shown in FIGS. 11; FIG. 12(a) is an element mapping image of Na, FIG. 12(b) is an element mapping image of K, and FIG. 12(c) is an element mapping image of Ca. In the drawings, yellow color shows Na, red color shows K and blue color shows Ca.

EDS spectrum analyses in FIG. 10(b) and FIG. 11(b) show that whey powder includes plural kinds of minerals. Moreover, it is evident from FIGS. 12 that minerals are scarcely present inside whey powder particle but are largely present at outer side thereof so as to cover the surface of the powder particle.

Accordingly, if whey powder particles granulated by the spray-drying technique are chipped away at their surfaces and fine powder composed of the chips taken from the particles is collected, minerals in whey powder can be concentrated.

For instance, according to the concentrating method of the embodiment illustrated in FIG. 4, as shown in Table 1, a whey powder raw material (RM) containing 4.1 wt % of plural kinds of minerals is subjected to the dry processing of the embodiment, whereby fine powder (secondary fine powder FF) containing 9.5 wt % of minerals can be separated and obtained.

Similarly, the mineral content in each of the raw material of whey powder and the secondary fine powder FF is measured, and as shown in Table 1, significant differences are recognized in the measurement results of K, Ca, Cl and P, indicating that these minerals are concentrated.

TABLE 1

|  |  | Mass ratio in terms of a dry weight | |
| --- | --- | --- | --- |
|  |  | Raw Material (RM) (wt %) | Fine Powder (Secondary Fine Powder) (FF) (wt %) |
| Minerals |  | 4.1 | 9.5 |
| Element | K | 1.9 | 4.6 |
|  | Ca | 0.9 | 2.1 |
|  | Cl | 0.5 | 1.3 |
|  | P | 0.3 | 0.7 |
|  | Na | 0.3 | 0.4 |
|  | S | 0.1 | 0.3 |
|  | Mg | 0.1 | 0.1 |

The minerals concentrated by the concentrating method using the mechanical dry processing of the embodiment can be further concentrated by means of a conventional wet technique, similarly to protein as described above.

An embodiment of the apparatus for carrying out the invention will be now described in detail based on preferred embodiments illustrated in the attached drawings.

Figure 2A:
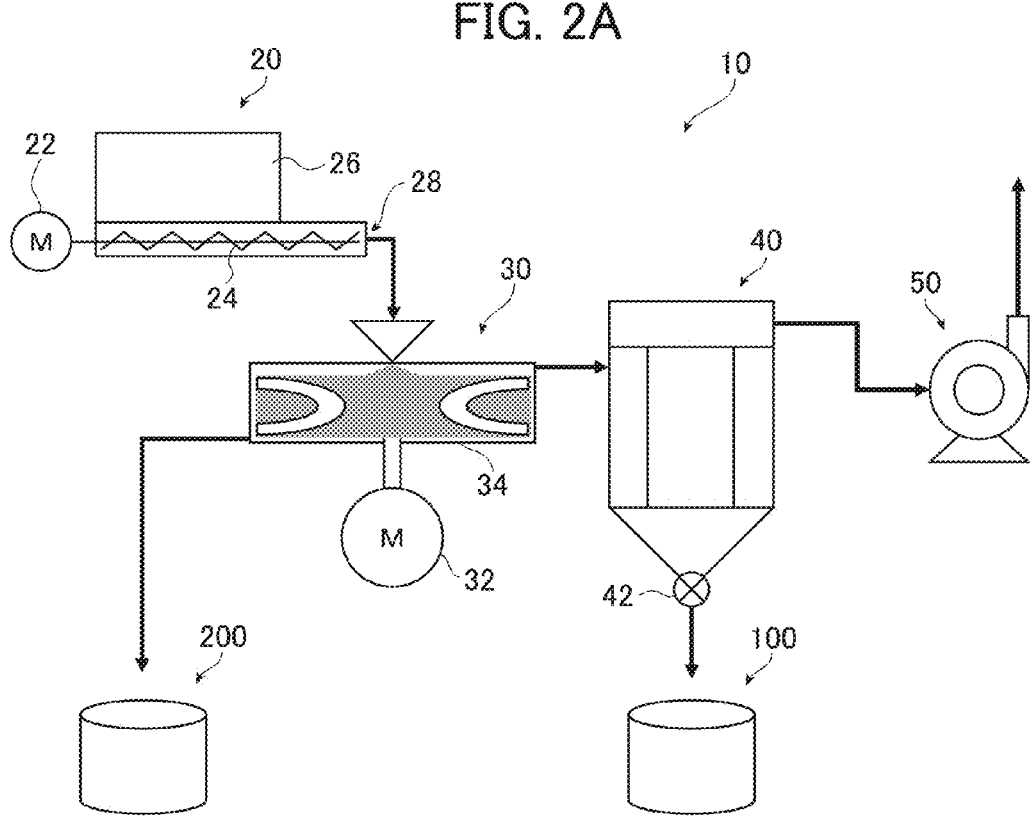
FIG. 2(a) is a schematic view showing an example of a dry concentrating apparatus for proteins in whey powder used in the method of the present invention.

FIG. 2(a) illustrates a schematic view showing an example of a dry concentrating apparatus for proteins (and minerals) that carries out the method of concentrating proteins (and minerals) in whey powder according to the embodiment of the invention.

A dry concentrating apparatus 10 is composed of a raw material feeder 20, an airflow-type classifier 30, a bag filter 40 and a fan (suction blower) 50. The dry concentrating apparatus 10 further includes a fine powder collector 100 for collecting fine powder from the bag filter 40, and a coarse powder collector 200 for collecting coarse powder classified in the airflow-type classifier 30.

The raw material feeder 20 is to carry out the step S10 of supplying a raw material shown in FIG. 1 and supplies the airflow-type classifier 30 with whey powder as a raw material. In the invention, the raw material feeder 20 is not particularly limited as long as a given amount of whey powder can be supplied to the airflow-type classifier 30, and, while any known raw material feeder can be used, a vessel type feeder that can supply a certain amount of a raw material, for example, is preferable. That is, as the raw material feeder 20, a screw feeder that takes out raw material powder (whey powder) in a hopper 26 at a constant rate using a screw 24 that is driven to rotate by a raw material feeder motor 22 and supplies a certain amount of whey powder to the airflow-type classifier 30 through an outlet 28 as in the illustrated example is preferably used.

The airflow-type classifier 30 constitutes the dry processing apparatus for whey powder in the invention and is to carry out the step S12 of producing whey chips as illustrated in FIG. 1 and the step S14 of classification as illustrated in FIG. 1.

The airflow-type classifier 30 may be anything that performs production of whey chips and classification simultaneously, and imparts a high shear force due to an air flow on the raw material powder to be classified or causes a large friction force among the raw material powder particles to thereby chip away at particle surfaces, and a known airflow-type classifier may be used, for example. As described later, the dry processing apparatus may include a pulverizer that carries out the step S12 of dry processing as illustrated in FIG. 1 and a classifier that carries out the step S14 of classification as illustrated in FIG. 1 in place of the airflow-type classifier 30.

The airflow-type classifier 30 illustrated in FIG. 2(a) has a built-in rotor 34 that rotates by means of an airflow-type classifier motor 32.

Figure 2B:
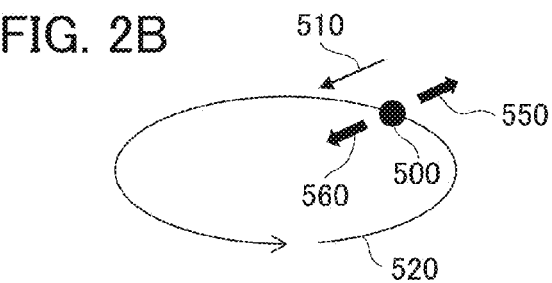
FIG. 2(b) is an illustrative diagram illustrating a force acting on whey powder particles in an airflow-type classifier as a dry processing apparatus in the dry concentrating apparatus shown in FIG. 2(a).

In the airflow-type classifier 30, as illustrated in FIG. 2(b), a whirling airflow generated by rotation of the rotor 34 and suction by the fan 50 is applied to supplied whey powder particles 500 to carry and whirl the particles 500 on an air current 510, whereby a current 520 of particles 500 becomes a whirling current. At this time, particle surfaces where a large amount of proteins (and minerals) is contained are chipped away by a shear force generated between the particles 500 and the whirling airflow or a friction force caused by contact or collision among particles or between particles and an inner wall of the apparatus, yielding whey chips in a fine-powder form, whereby fine powder containing whey chips and coarse powder containing particles whose surfaces have been chipped away are produced.

In other words, inside the airflow-type classifier 30, due to an impact force imparted on raw material powder (whey powder) by a whirling airflow and a shear force caused by contact between raw material powder particles or contact between raw material powder and the inner wall of the apparatus, particle surfaces of whey powder as a raw material are chipped away, and thus whey chips are produced.

The step S12 of producing whey chips illustrated in FIG. 1 is carried out in this manner.

In the meantime, the particles 500 of whey powder (including both fine powder containing whey chips and coarse powder containing particles whose surfaces have been chipped away) receive a centrifugal force 550 that exerts an outward force in relation to the rotation axis of the rotor 34 due to its rotation, as illustrated in FIG. 2(b). In addition, the apparatus is designed such that a drag 560 due to a sucking airflow generated by the fan 50 becomes a force in a direction toward the rotation axis of the rotor 34. At this time, the particles 500 having the larger mass receive the larger centrifugal force 550, and the particles 500 having the larger cross section are subjected to the larger drag 560 of an airflow caused by the fan 50.

Accordingly, by controlling at least one of the feeding rate of whey powder (a feeding amount per unit time), the air amount (an amount of supplied airflow per unit time) and the number of revolutions of the rotor 34 in the airflow-type classifier, the forces which fine powder containing whey chips and coarse powder containing particles whose surfaces have been chipped away are subjected to can be varied.

As a result, fine powder containing whey chips in a fine-powder form that contain a large amount of proteins (and minerals) is carried by an airflow caused by the fan 50 and moves to the bag filter 40. On the other hand, coarse powder cannot be carried by an airflow caused by the fan 50 and is discharged from the airflow-type classifier 30.

In this manner, the step S14 of classification illustrated in FIG. 1 is carried out in the airflow-type classifier 30.

The bag filter 40 is to separate powder that enters together with a gas from a gas and collect the powder and is not particularly limited; a known bag filter may be used. Fine powder that moved into the bag filter 40 along with an airflow is separated from the gas by a filter (not shown) in the bag filter 40. Fine powder separated from the gas in the bag filter 40 is collected in the fine powder collector 100 when a fine powder collecting valve provided at a lower portion of the bag filter 40 is released. The step S16 of collecting fine powder illustrated in FIG. 1 is carried out in this manner.

In the meantime, coarse powder discharged from the airflow-type classifier 30 is collected in the coarse powder collector 200. The step S20 of collecting coarse powder illustrated in FIG. 1 is carried out in this manner.

The fine powder collector 100 and the coarse powder collector 200 are not particularly limited, and a known powder collector may be used.

In the invention, following the collection of fine powder, when the step S18 of determination illustrated in FIG. 1 determines that further concentration of proteins in fine powder is necessary, fine powder collected in the fine powder collector 100 is preferably put in the hopper 26 of the raw material feeder 20 as raw material powder.

On the other hand, following the collection of coarse powder, when the step S22 of determination illustrated in FIG. 1 determines that collection of proteins (and minerals) from coarse powder is necessary, coarse powder collected in the coarse powder collector 200 is preferably put in the hopper 26 of the raw material feeder 20 as raw material powder.

In the example described above, while the airflow-type classifier 30 that performs production of whey chips and classification simultaneously is used as the dry processing apparatus of the invention, the invention is not limited thereto, and such production and classification may be performed by separate apparatuses.

Figure 3:
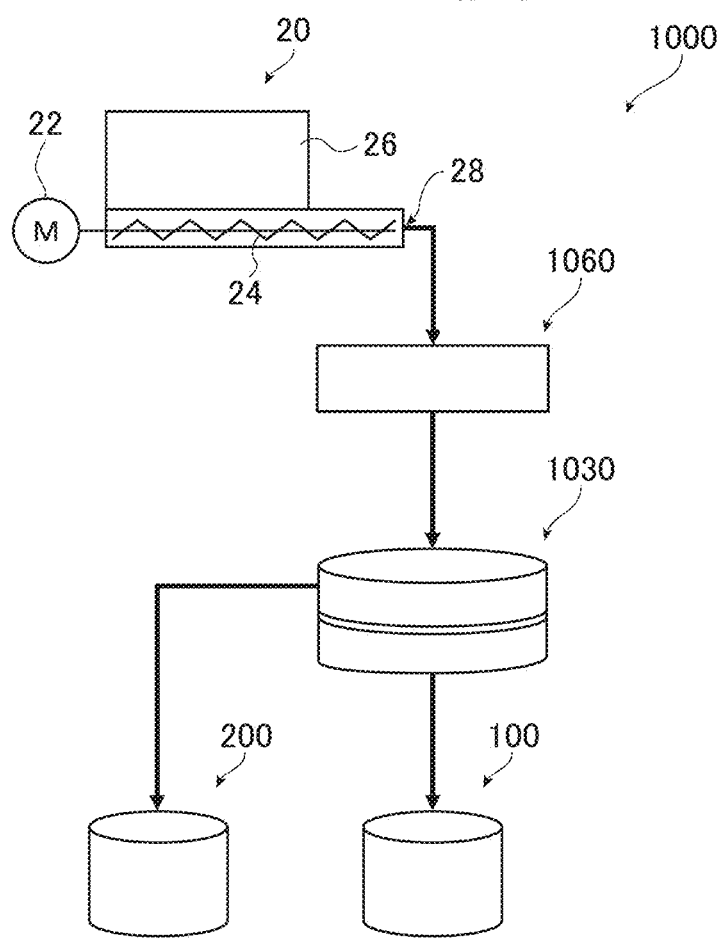
FIG. 3 is a schematic view showing another example of a dry processing apparatus used in the method of the present invention.

FIG. 3 illustrates a schematic view showing an example of a dry concentrating apparatus for proteins (and minerals) in whey powder in another configuration.

The dry concentrating apparatus 1000 for proteins (and minerals) is composed of a raw material feeder 20, a pulverizer 1060, a vibration sieving device 1030, a bag filter 40 and a fan 50, and further includes a fine powder collector 100 for collecting fine powder from the bag filter 40 and a coarse powder collector 200 for collecting coarse powder sieved by the vibration sieving device 1030.

Note that the dry concentrating apparatus 1000 illustrated in FIG. 3 has the same configuration as that of the dry concentrating apparatus 10 except that the pulverizer 1060 and the vibration sieving device 1030 are provided in place of the airflow-type classifier 30, and hence the similar constitutional elements are assigned with the same reference numerals, descriptions of which are omitted.

The raw material feeder 20 carries out the step S10 of supplying a raw material illustrated in FIG. 1 by supplying the pulverizer 1060 with whey powder as a raw material.

The pulverizer 1060 is to carry out the step S12 of producing whey chips illustrated in FIG. 1 and performs a mechanical processing lightly so as not to pulverize but merely chip away at particle surfaces of the supplied raw material; accordingly, particle surfaces where a larger amount of proteins (and minerals) is contained are chipped away to produce whey chips in a fine-powder form, thereby yielding a mixture of fine powder containing whey chips and coarse powder containing particles whose surfaces have been chipped away.

The mixed powder is then supplied to the vibration sieving device 1030.

The vibration sieving device 1030 is to carry out the step S14 of classification illustrated in FIG. 1, and has a built-in vibration source (not shown); when a sieve (not shown) on which the supplied mixture powder is placed is vibrated, the vibration sieving device 1030 classifies the mixture powder, by means of openings of the sieve, into fine powder containing whey chips in a fine-powder form that contains a large amount of proteins (and minerals) beneath the sieve and coarse powder containing particles whose surfaces have been chipped away on the sieve. The step S14 of classification illustrated in FIG. 1 is carried out by the vibration sieving device 1030 in this manner.

Thereafter, fine powder that has passed through the sieve openings of the vibration sieving device 1030 and fallen under the sieve is collected in the fine powder collector 100, whereas coarse powder remaining on the sieve is collected in the coarse powder collector 200.

EXAMPLE

The invention is specifically described based on an example.

First, using 0.85 Kg of whey powder (see FIGS. 5(*a*) and 5(*b*)) with a protein ratio (protein content) of 13.2 wt % and an average particle size (particle size) (D50) of 77.7 μm (see FIG. 13(*a*)) prepared as a raw material sample (RM), the method for concentrating proteins (and minerals) in whey powder according to the embodiment was repeated to classify the raw material sample into fine powder and coarse powder as illustrated in FIG. 4.

FIG. 4 is a diagram showing repetition of production of and classification into fine powder and coarse powder through the mechanical dry processing using the raw material sample in the example, and the protein ratios at each production.

First, the raw material sample (RM) had a protein content of 13.2 wt %. The protein content was obtained by measuring a mass of nitrogen element in the raw material sample using TruMac N (available from LECO Japan Corporation) and converting the measurement result by applying a conversion coefficient of 6.38 according to the fifth edition of Tables of Food Composition 2004 (Kagawa Nutrition University Publishing Division, January, 2004), P. 14, Table 7, Nitrogen-Protein conversion coefficients, 13., Milk group. In the description of the present application, a ratio (content) refers to, unless otherwise noted, a mass ratio in terms of a dry weight from which the influence of moisture is excluded.

The raw material sample (RM) had a mineral content of 4.1 wt %. The mineral content was calculated by burning a sample at a high temperature using an electric furnace and finding a difference in weight between before and after combustion. Similarly to a protein content described above, a content refers to a mass ratio in terms of a dry weight from which the influence of moisture is excluded.

In the raw material sample (RM), the respective mineral contents were a K content of 1.9 wt %, a Ca content of 0.9 wt %, a Cl content of 0.5 wt %, and a P content of 0.3 wt %. Each of the mineral contents was calculated by measuring a mass of each element in the sample using a scanning-type X-ray fluorescence spectrometer (ZSX PrimusII, available from Rigaku Corporation) based on the foregoing whole mineral content. As described above, a content is a mass ratio in terms of a dry weight from which the influence of moisture is excluded.

The raw material sample (RM) had an average particle size (D50) of 77.7 μm and showed a particle size distribution of FIG. 13(*a*).

Using 0.85 Kg of the raw material sample (RM) as described above, the method for concentrating proteins (and minerals) in whey powder according to the embodiment was implemented using an airflow-type classifier, TURBO CLASSIFIER TC-15 (available from Nisshin Engineering Inc.) as the dry processing apparatus of the invention that performs the mechanical dry processing.

In the first implementation of the method for concentrating proteins (and minerals) in whey powder according to the embodiment, the raw material sample (RM) shown in FIGS. 5(*a*) and 5(*b*) was subjected to the mechanical dry processing to be concentrated, whereby 0.23 Kg (28.7 wt %) of fine powder (primary fine powder) (F) shown in FIGS. 6(*a*) and 6(*b*) and 0.58 Kg (71.3 wt %) of coarse powder (primary coarse powder) (C) shown in FIGS. 7(*a*) and 7(*b*) were obtained. In this process, TURBO CLASSIFIER TC-15 was operated under the conditions of a raw material feeding rate of 5.8 Kg/h, a number of revolutions of 1,500 rpm, and an air volume of 2.5 m$^3$/min.

As a result, the primary fine powder (F) had a protein content of 21.6 wt %, while the primary coarse powder (C) had a protein content of 9.9 wt %. In addition, the primary fine powder (F) had an average particle size (D50) of 30.6 μm and a particle size distribution shown in FIG. 13(*b*), while the primary coarse powder (C) had an average particle size (D50) of 80.3 μm and a particle size distribution shown in FIG. 13(*c*).

Next, the second implementation of the method for concentrating proteins (and minerals) took place, in which the primary fine powder (F) and the primary coarse powder (C) produced in the first implementation were each subjected further to the mechanical dry processing using TURBO CLASSIFIER TC-15.

The primary fine powder (F) was again subjected to the mechanical dry processing in the second implementation of the concentrating method. In this process, TURBO CLASSIFIER TC-15 was operated under the conditions of a raw material feeding rate of 5.8 Kg/h, a number of revolutions of 4,000 rpm, and an air volume of 2.5 m$^3$/min.

As a result, 0.06 Kg (34.3 wt %) of fine powder (secondary fine powder) (FF) shown in FIGS. 8(*a*) and 8(*b*) and 0.11 Kg (65.7 wt %) of coarse powder (coarse fine powder) (FC) were obtained. At this time, the secondary fine powder (FF)

had a protein content of 32.1 wt %, while the coarse powder (FC) had a protein content of 15.3 wt %. The secondary fine powder (FF) had a mineral content of 9.5 wt %. In addition, in the secondary fine powder (FF), the respective mineral contents were a K content of 4.6 wt %, a Ca content of 2.1 wt %, a Cl content of 1.3 wt %, and a P content of 0.7 wt %.

Figure 13A:
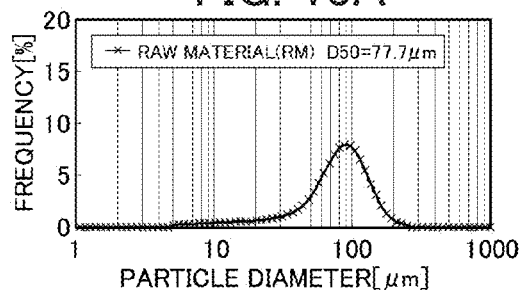
FIGS. 13(a), 13(b), 13(c), 13(d), 13(e), 13(f), and 13(g) are diagrams showing measurement results of particle size distributions in the respective samples in Examples.
Figure 13B:
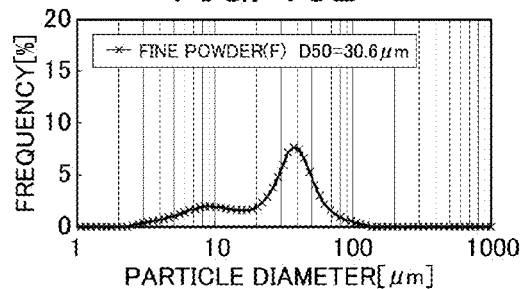
Figure 13C:
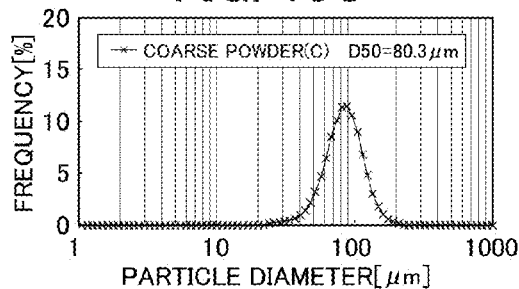
Figure 13D:
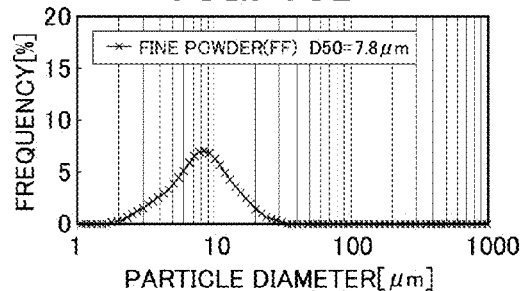
Figure 13E:
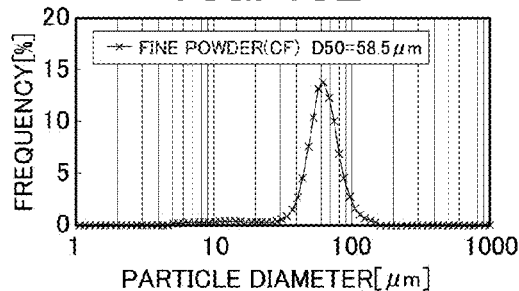
Figure 13F:
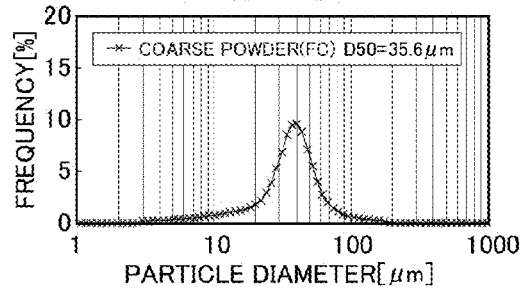

The secondary fine powder (FF) had an average particle size (D50) of 7.8 μm and a particle size distribution shown in FIG. 13(d), while the coarse fine powder (FC) had an average particle size (D50) of 35.6 μm and a particle size distribution shown in FIG. 13(f).

Since the protein content increased in the secondary fine powder (FF) compared to the primary fine powder (F), it is explicit that repetition of the processing further concentrates proteins.

In addition, since the mineral content increased in the secondary fine powder (FF) compared to the raw material sample (RM), it is explicit that repetition of the processing concentrates minerals.

Meanwhile, the primary coarse powder (C) was again subjected to the mechanical dry processing in the second implementation of the concentrating method. In this process, TURBO CLASSIFIER TC-15 was operated under the conditions of the raw material feeding rate of 5.4 Kg/h, a number of revolutions of 1,200 rpm, and an air volume of 2.5 m³/min.

As a result, 0.28 Kg (49.3 wt %) of fine powder (fine coarse powder) (CF) and 0.29 Kg (50.7 wt %) of coarse powder (secondary coarse powder) (CC) shown in FIGS. 9(a) and 9(b) were obtained. At this time, the fine powder (CF) had a protein content of 11.3 wt %, while the secondary coarse powder (CC) had a protein content of 8.8 wt %.

Figure 13G:
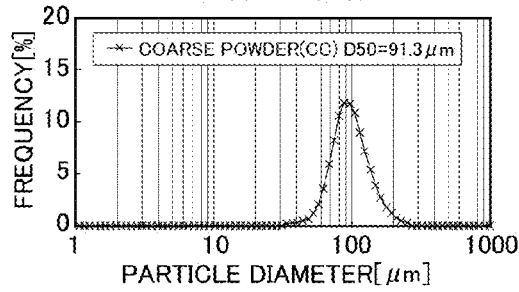

The fine coarse powder (CF) had an average particle size (D50) of 58.5 μm and a particle size distribution shown in FIG. 13(e), while the secondary coarse powder (CC) had an average particle size (D50) of 91.3 μm and a particle size distribution shown in FIG. 13(g).

Since the protein content increased in the fine coarse powder (CF) compared to the primary coarse powder (C), it is explicit that repetition of the processing enables collection of proteins that could not be collected in the first processing.

An amount of lactose contained in 100 g each of the raw material sample (RM), the secondary fine powder (FF) and the secondary coarse powder (CC) was measured using a high-performance liquid chromatography, and resulted in that the raw material sample (RM) prior to the dry processing had a lactose content of 71.1 g, the secondary fine powder (FF) after the dry processing had a lactose content of 35.6 g, and the secondary coarse powder (CC) after the dry processing had a lactose content of 78.2 g. That is, the lactose content decreased in the secondary fine powder (FF) compared to the raw material sample (RM), whereas the lactose content increased in the secondary coarse powder (CC) compared to the raw material sample (RM).

This result reveals that lactose is concentrated at the side of coarse powder through repetition of the concentrating method using the mechanical dry processing according to the embodiment.

FIG. 5(a) is an SEM photograph of whey powder used as the raw material, and FIG. 5(b) is an enlarged photograph of the whey powder (RM) shown in FIG. 5(a). The particle surfaces are apparently smooth and have very few chipped portions.

Figure 6A:
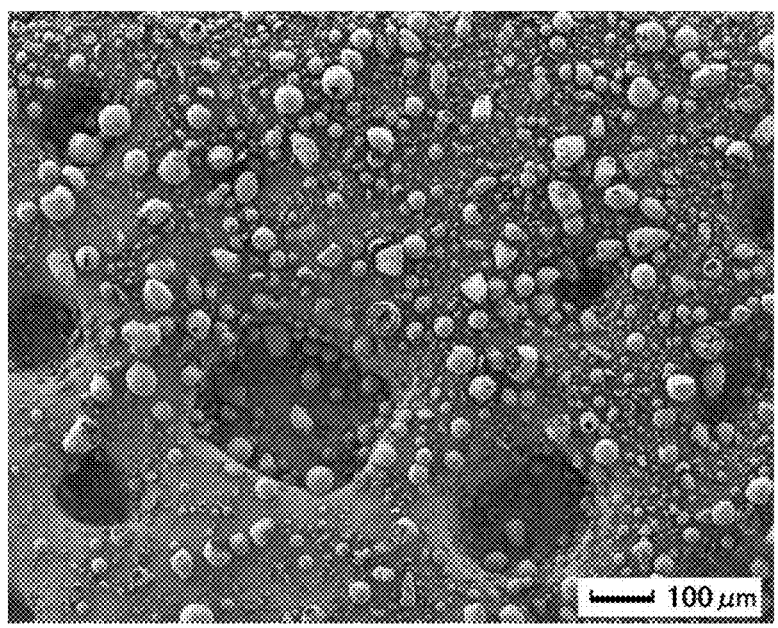
FIG. 6(a) is a drawing-substituting photograph, photographed by a scanning electron microscope (SEM), of fine powder (F) collected at the fine powder side in whey powder processed by the dry processing apparatus.
Figure 6B:
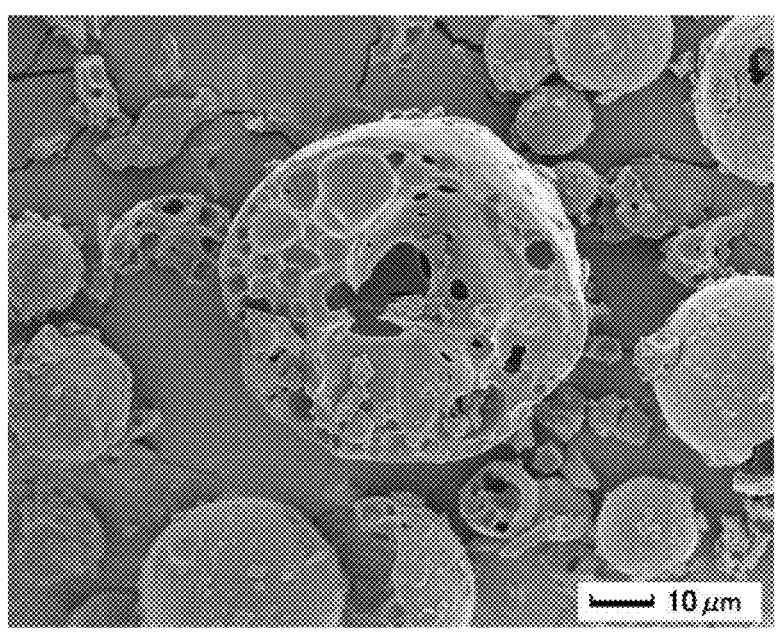
FIG. 6(b) is an enlargement of the photograph of FIG. 6(a).

FIG. 6(a) is an SEM photograph of the primary fine powder (F), and FIG. 6(b) is an enlarged photograph of the primary fine powder (F) shown in FIG. 6(a). FIG. 5(a) and FIG. 6(a) are shown in the same magnification, while FIG. 5(b) and FIG. 6(b) are shown in the same magnification; FIGS. 6(a) and 6(b) reveal that the primary fine powder is composed of, among a variety of sizes of whey powder particles seen in FIGS. 5(a) and 5(b), particle-surface fine powder of whey formed of chips taken from surfaces of large particles, very fine particles, and fine particle fragments that are slightly larger than the very fine particles and that have been chipped away but have some remaining surfaces.

This result indicates that the mechanical dry processing of the invention does not pulverize whey powder particles, particularly large particles, but chips away at or scrapes particle surfaces, which contain a large amount of proteins (and minerals) since proteins aggregate or heavily gather at particle surfaces, to thereby produce whey chips or whey flakes, and classifies these whey chips or whey flakes together with very fine particles and fine particle fragments.

Note that while several large holes are seen in FIG. 6(a), these are of the surface shape of a fixing material that was used to fix fine powder (FF) particles thereon when the SEM photograph was taken.

Figure 7A:
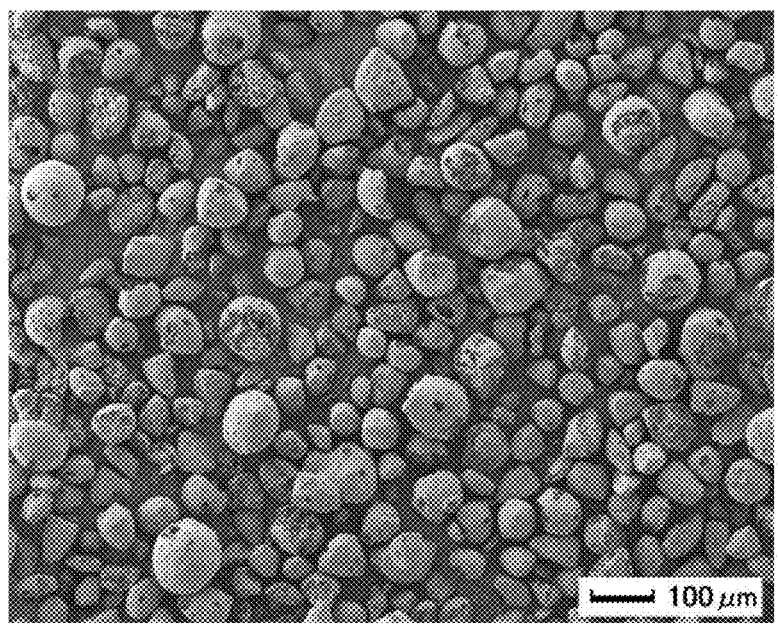
FIG. 7(a) is a drawing-substituting photograph, photographed by a scanning electron microscope (SEM), of coarse powder (C) collected at the coarse powder side in whey powder processed by the dry processing apparatus.
Figure 7B:
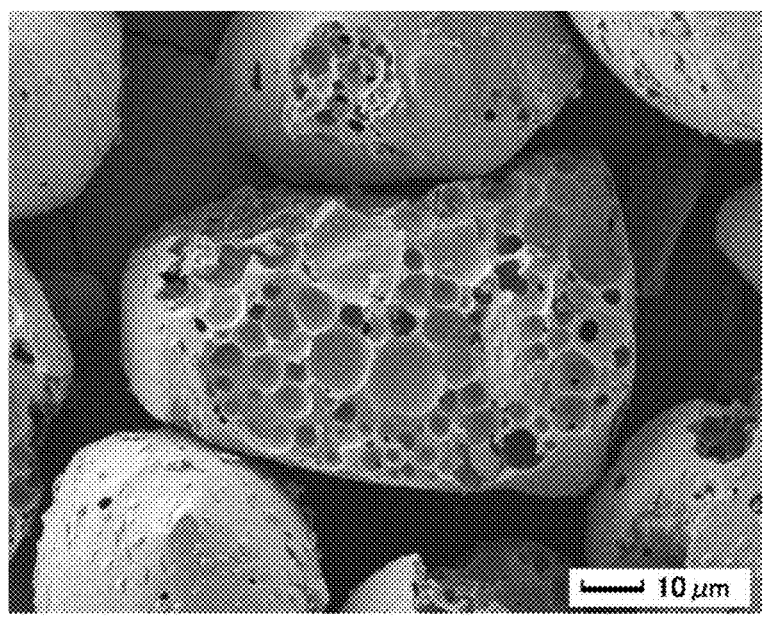
FIG. 7(b) is an enlargement of the photograph of FIG. 7(a).

Next, FIG. 7(a) is an SEM photograph of the primary coarse powder (C), and FIG. 7(b) is an enlarged photograph of the primary coarse powder (C) shown in FIG. 7(a). FIGS. 7(a) and 7(b) reveal that while particle surfaces are chipped, the constituent particles are not significantly different from those of the raw material shown in FIGS. 5(a) and 5(b).

This result also indicates that the mechanical dry processing of the invention does not pulverize whey powder particles but chips away at or scrapes particle surfaces where a large amount of proteins (and minerals) is present to produce whey chips or whey flakes, and classifies these whey chips or whey flakes together with very fine particles and fine particle fragments.

In addition, FIG. 8(a) is an SEM photograph of the secondary fine powder (FF), and FIG. 8(b) is an enlarged photograph of the secondary fine powder (FF) shown in FIG. 8(a). FIG. 5(a) showing the raw material (RM), and FIG. 6(a) and FIG. 8(a) showing the primary fine powder (F) are shown in the same magnification, while FIG. 5(b), FIG. 6(b) and FIG. 8(b) are shown in the same magnification; FIGS. 8(a) and 8(b) barely show particles like those seen in FIGS. 5(a) and 5(b) and FIGS. 6(a) and 6(b) but show fine powder containing whey particle-surface fine powder being mostly fragments.

This result indicates that the mechanical dry processing of the invention does not pulverize whey powder particles but chips away at or scrapes particle surfaces, which contain a large amount of proteins (and minerals) since proteins (and minerals) aggregate or heavily gather at surfaces, to produce whey chips or whey flakes, and classifies these whey chips or whey flakes.

Note that while several large holes are seen in FIG. 8(a), similarly to FIG. 6(a), these are of the surface shape of a fixing material that was used to fix fine powder (FF) particles thereon when the SEM photograph was taken.

Next, FIG. 9(a) is an SEM photograph of the secondary coarse powder (CC), and FIG. 9(b) is an enlarged photograph of the secondary coarse powder (CC) shown in FIG. 9(a). FIG 9(a) and 9(b) reveal that while particle surfaces are chipped, the constituent particles are not significantly different from those of the raw material shown in FIGS. 5(a) and 5(b) and those in FIGS. 7(a) and (b).

This result also indicates that the mechanical dry processing of the invention does not pulverize whey powder particles but chips away at or scrapes particle surfaces where a large amount of proteins (and minerals) is present to produce whey chips or whey flakes, and classifies these whey chips or whey flakes.

FIGS. 13(a) to 13(g) are particle size distributions of the raw material, fine powder and coarse powder samples. In the present description, the particle size distribution was obtained by measurements using the laser diffraction-scattering technique with Microtrac MT3300 (available from Nikkiso Co., Ltd.)

FIG. 13(a) is a particle size distribution of the raw material sample (RM), and FIGS. 13(b) and 13(c) are respectively particle size distributions of the primary fine powder (F) and the primary coarse powder (C) classified in the first mechanical dry processing. Comparing FIG. 13(a) with FIG. 13(c), it is evident that they are scarcely different from each other in the modal particle size, and thus the particles were scarcely pulverized but were chipped away only at their surfaces.

Turning to FIGS. 13(d) and 13(f), shown are particle size distributions of the secondary fine powder (FF) and the coarse fine powder (FC) classified in the second mechanical dry processing performed on the primary fine powder (F). Comparing FIG. 13(b) with FIG. 13(f), it is evident that, also in the second mechanical dry processing performed on the primary fine powder (F), the fine powder (F) before the second mechanical dry processing and the coarse powder (FC) after the second mechanical dry processing are scarcely different from each other in the modal particle size, like in the first mechanical dry processing, and thus the particles were scarcely pulverized but were chipped away only at their surfaces.

Turning to FIGS. 13(e) and 13(g), shown are particle size distributions of the fine coarse powder (CF) and the secondary coarse powder (CC) classified in the second mechanical dry processing performed on the primary coarse powder (C). Comparing FIG. 13(c) with FIG 13(g), it is evident that, also in the second mechanical dry processing performed on the primary coarse powder (C), the coarse powder (C) before the second mechanical dry processing and the secondary coarse powder (CC) after the second mechanical dry processing are scarcely different from each other in the modal particle size, like in the first mechanical dry processing, and thus the particles were scarcely pulverized but were chipped away only at their surfaces.

As is apparent from the foregoing, in the method for concentrating proteins in whey powder according to the embodiment, since the mechanical dry processing with the dry processing apparatus chips away at or scrapes particle surfaces of whey powder and collects particle-surface fine powder of whey including the thus produced whey chips and whey flakes, proteins in whey powder can be concentrated as being held in the dry state.

In addition, in the method for concentrating proteins in whey powder according to the embodiment, since the mechanical dry processing with the dry processing apparatus chips away at or scrapes particle surfaces of whey powder and collects particle-surface fine powder of whey including the thus produced whey chips and whey flakes, minerals in whey powder can be also concentrated as being held in the dry state.

In addition, in the method of concentrating proteins in whey powder according to the embodiment, since the mechanical dry processing with the dry processing apparatus collects coarse whey powder whose particle surfaces have been chipped away or scraped, lactose in whey powder can be also concentrated as being held in the dry state.

The present invention is basically configured as above. While the method for concentrating proteins in whey powder according to the embodiment of the invention have been described above in detail, the invention is by no means limited to the foregoing embodiment or examples and it should be understood that various improvements and modifications are possible without departing from the scope and spirit of the invention.

REFERENCE SIGNS LIST 10 dry concentrating apparatus for proteins (and minerals)
20 raw material feeder
22 raw material feeder motor
24 screw
26 hopper
28 outlet
30 airflow-type classifier
32 airflow-type classifier motor
40 bag filter
42 fine powder collecting valve
50 fan
100 fine powder collector
200 coarse powder collector
500 particles (raw material, fine powder, coarse powder)
510 air current
520 particle current
550 centrifugal force
560 drag of air current
1000 dry processing apparatus
1030 vibration sieving device
1060 pulverizer

The invention claimed is:

1. A concentrating method for concentrating one or more particular components in powder using a dry processing apparatus that performs a mechanical dry processing, the powder being formed by granulating a solution containing two or more components, the method comprising:
 a step of supplying the dry processing apparatus with the powder;
 a step of producing chips in a fine-powder form by performing the dry processing on the powder supplied to the dry processing apparatus to chip away at particle surfaces of the powder, the particle surfaces containing the one or more particular components;
 a step of classifying the powder into fine powder containing the produced chips and coarse powder containing particles whose surfaces have been chipped away; and
 a step of collecting the classified fine powder containing the chips,
 wherein the powder is formed by granulating a solution containing two or more components having different dissolution properties using a spray-drying technique,
 wherein the powder is whey powder, and the one or more particular components include proteins and minerals,
 wherein, in an airflow-type classifier, the powder supplied into a classifying chamber is carried on a whirling airflow such that particle surfaces of the powder are chipped away to produce the chips and is classified into the fine powder containing the produced chips, whereby the airflow-type classifier carries out the step of producing chips and the step of classifying for obtaining fine powder containing the chips simultaneously, and
 wherein an amount of the chips produced in the step of producing chips is controlled by controlling at least one of a feeding rate of the powder to the airflow-type classifier, an air volume, and a number of revolutions of a rotor in the airflow-type classifier.

2. The concentrating method for concentrating one or more particular components in powder using a dry processing apparatus that performs a mechanical dry processing, the powder being formed by granulating a solution containing two or more components, the method comprising:
a step of supplying the dry processing apparatus with the powder;
a step of producing chips in a fine-powder form by performing the dry processing on the powder supplied to the dry processing apparatus to chip away at particle surfaces of the powder, the particle surfaces containing the one or more particular components;
a step of classifying the powder into fine powder containing the produced chips and coarse powder containing particles whose surfaces have been chipped away; and
a step of collecting the classified fine powder containing the chips,
wherein the powder is formed by granulating a solution containing two or more components having different dissolution properties using a spray-drying technique,
wherein the powder is whey powder, and the one or more particular components include proteins and minerals,
wherein the dry processing apparatus is an airflow-type classifier including a classifying chamber, and
wherein, in the airflow-type classifier, the powder supplied into the classifying chamber is carried on a whirling airflow such that particle surfaces of the powder are chipped away to produce the chips and is classified into the fine powder containing the produced chips, whereby the airflow-type classifier carries out the step of producing chips and the step of classifying for obtaining fine powder containing the chips simultaneously,
wherein a classification point in the step of classifying for obtaining the fine powder containing the chips at which the fine powder containing the chips is separated from the coarse powder is controlled by controlling at least one of a feeding rate of the powder to the airflow-type classifier, an air volume, and a number of revolutions of a rotor in the airflow-type classifier.

3. The concentrating method according to claim 1, wherein the dry processing apparatus includes a pulverizer and a classifier,
wherein the step of producing chips is a step of producing the chips by chipping away at particle surfaces of the powder using the pulverizer, and
wherein the step of classifying for obtaining the fine powder containing the chips is a step of classifying the powder into the fine powder containing the produced chips and the coarse powder using the classifier.

4. The concentrating method according to claim 3, wherein the pulverizer comprises one or more selected from a group consisting of an airflow-type pulverizer, a friction-type pulverizer, an impact-type pulverizer and a ball-type pulverizer, and
wherein the classifier comprises one or more selected from a group consisting of an airflow-type classifier and a vibration sieving device.

5. The concentrating method according to claim 1, wherein one or more particular components in the fine powder are concentrated by repeating:
a step of again supplying the dry processing apparatus with, as a raw material, the fine powder containing the chips collected in the step of collecting the fine powder,
a step of producing chips in a finer-powder form by performing the dry processing on the supplied fine powder containing the chips to chip away at particle surfaces of the fine powder,
a step of separating finer powder containing the produced chips in a finer-powder form from the remaining fine powder whose particle surfaces have been chipped away, and
a step of collecting the separated finer powder.

6. The concentrating method according to claim 1, further comprising a step of collecting the coarse powder containing particles whose surfaces have been chipped away.

7. The concentrating method according to claim 6, wherein one or more particular components in the fine powder are concentrated by repeating:
a step of again supplying the dry processing apparatus with, as a raw material, the coarse powder containing particles whose surfaces have been chipped away and collected in the step of collecting the coarse powder,
a step of further producing chips in a fine-powder form by performing the dry processing on the supplied coarse powder containing particles whose surfaces have been chipped away to chip away at particle surfaces of the coarse powder,
a step of separating fine powder containing the produced chips from the remaining coarse powder whose particle surfaces have been further chipped away, and
a step of collecting the separated fine powder.

8. The concentrating method according to claim 1, wherein the two or more components include at least one of proteins, minerals and lactose.

9. The concentrating method according to claim 6,
wherein the powder is whey powder,
wherein the one or more particular components include proteins, minerals and lactose, and
wherein the coarse powder containing particles whose surfaces have been chipped away is the coarse powder whose particle surfaces have been chipped away and which contains a lactose component.

10. A method for concentrating a particular component further comprising a process of concentrating one or more particular components by a wet operation, using as a raw material an intermediate product containing fine powder in which one or more particular components are concentrated by the concentrating method according to claim 1.

11. The method for concentrating a particular component according to claim 10, wherein the one or more particular components are proteins.

12. The method for concentrating a particular component according to claim 10, wherein the one or more particular components are minerals.

13. A method for concentrating a particular component further comprising a process of concentrating one or more particular components by a wet operation, using as a raw material an intermediate product containing coarse powder in which one or more particular components are concentrated by the concentrating method according to claim 6.

14. The method for concentrating a particular component according to claim 13, wherein the one or more particular components are lactose.

* * * * *